US011645350B2

(12) United States Patent
Wang et al.

(10) Patent No.: US 11,645,350 B2
(45) Date of Patent: May 9, 2023

(54) SYSTEM AND METHOD FOR SEARCHING BILLERS WITH SERVICE AREA POPULARITY MODEL AND MACHINE LEARNING

(71) Applicant: JPMorgan Chase Bank, N.A., New York, NY (US)

(72) Inventors: Jiangling Wang, Brooklyn, NY (US); Song Ting Ceng, Brooklyn, NY (US); Hong Ji, Dix Hills, NY (US); Riti Singhal, Sayreville, NJ (US); Liang Zhou, New York, NY (US); Christopher J Leasor, Westfield, NJ (US); Somnath Choudhuri, Newark, DE (US); Shailender Singh, Issaquah, WA (US); Prashant K Dhingra, Redmond, WA (US); Parambir S Mudhar, Jersey City, NJ (US); Rakesh Pathak, Millburn, NJ (US); James Kaczmarczyk, New Hyde Park, NY (US); Akshay Karnawat, Palisades Park, NJ (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 333 days.

(21) Appl. No.: 17/164,209

(22) Filed: Feb. 1, 2021

(65) Prior Publication Data

US 2022/0245214 A1    Aug. 4, 2022

(51) Int. Cl.
*G06F 16/9538* (2019.01)
*G06N 20/00* (2019.01)
(Continued)

(52) U.S. Cl.
CPC ........ *G06F 16/9538* (2019.01); *G06F 18/214* (2023.01); *G06F 18/2193* (2023.01);
(Continued)

(58) Field of Classification Search
CPC .............. G06F 16/9538; G06F 18/214; G06F 18/2193; G06F 16/9038; G06N 20/00; G06Q 20/10; G06Q 30/0204; G06Q 20/14
See application file for complete search history.

(56) References Cited

U.S. PATENT DOCUMENTS

2008/0243838 A1   10/2008 Scott et al.
2009/0244600 A1   10/2009 Haycock et al.
(Continued)

OTHER PUBLICATIONS

Weber et al. A Domain-Oriented Analysis of the Impact of Machine Learning—The Case of Retailing. Jan. 24, 2019 (Jan. 24, 2019), [retrieved on Mar. 16, 2022], Retrieved from the Internet: <URL:https://www.mdpi.com/301254> pp. 1-14.

Official Communication Received in PCT Application No. PCT/US2022/014713, dated Mar. 29, 2022.

*Primary Examiner* — Jared M Bibbee
(74) *Attorney, Agent, or Firm* — Greenblum & Bernstein, P.L.C.

(57) ABSTRACT

Various methods, apparatuses/systems, and media for implementing a payment application module for searching billets are disclosed. A plurality of data sources include customer profile data, customer payment history data, biller information data, and biller directory data. A processor operatively coupled to the plurality of data sources via a communication network builds a customer profile service area popularity model based on the customer profile data, customer payment history data, biller information data, and biller directory data; receives search query data for searching a biller; builds a biller search machine learning model to optimize weights (Continued)

applied to the search query data; and ranks search results by utilizing the machine learning model in response to the search query data.

20 Claims, 7 Drawing Sheets

(51) Int. Cl.
*G06Q 20/10* (2012.01)
*G06F 18/214* (2023.01)
*G06F 18/21* (2023.01)
*G06Q 30/0204* (2023.01)
(52) U.S. Cl.
CPC ............. *G06N 20/00* (2019.01); *G06Q 20/10* (2013.01); *G06Q 30/0204* (2013.01)

(56) References Cited

U.S. PATENT DOCUMENTS

| | | | |
|---|---|---|---|
| 2014/0195416 A1* | 7/2014 | Linscott | G06Q 20/023 |
| | | | 705/39 |
| 2015/0012382 A1* | 1/2015 | Ceribelli | G06Q 50/01 |
| | | | 705/26.35 |
| 2015/0142545 A1* | 5/2015 | Ceribelli | G06Q 30/0224 |
| | | | 705/14.23 |
| 2016/0005129 A1* | 1/2016 | Chavarria | G06Q 40/08 |
| | | | 705/4 |
| 2017/0024657 A1 | 1/2017 | Sahu et al. | |
| 2019/0095968 A1* | 3/2019 | Ceribelli | G06Q 30/0609 |
| 2020/0014642 A1 | 1/2020 | Sidi et al. | |

* cited by examiner

SYSTEM AND METHOD FOR SEARCHING BILLERS WITH SERVICE AREA POPULARITY MODEL AND MACHINE LEARNING

TECHNICAL FIELD

This disclosure generally relates to bill payment, and, more particularly, to methods and apparatuses for implementing a payment application module for automatically searching billers by utilizing service area popularity model and machine learning.

BACKGROUND

Many entities such as, for example, utility services, education providers, financial entities, and even government agencies offer payment options for users. The payment options are traditionally provided separately by each of the many entities and may include onetime payment options as well as recurring payment options. Historically, offering payment options separately by each of the many entities have resulted in varying degrees of success with respect to ease of use for the user, pooling of various types of funds, and operating efficiencies.

One drawback of conventionally offering separate payment, options is that in many instances, there is no single platform for a user to find a payee (i.e., biller), view bills and to make payments. As a result, the user must navigate numerous payment platforms to view a payee and pay bills from different entities.

For example, customers today who utilizes payment application may have considerable issuers finding the correct payee in payment application search as it may not leverage the rich data sets in payments to provide effective payee suggestions. For example, users of a payment application must first search for a payee in the system before they can pay a bill, thereby adding complexity and frustrations for viewing bills and making payments.

SUMMARY

The present disclosure, through one or more of its various aspects, embodiments, and/or specific features or sub-components, provides, among other features, various systems, servers, devices, methods, media, programs, and platforms for implementing a payment application module for searching billers (i.e., payees) by utilizing service area popularity model and machine learning, but the disclosure is not limited thereto.

According to an aspect of the present disclosure, a method for implementing a payment application module for searching billers by utilizing one or more processors and one or more memories is disclosed. The method may include: accessing a plurality of data sources that include customer profile data, customer payment history data, biller information data, and biller directory data: building a customer profile service area popularity model based on the customer profile data, customer payment history data, biller information data, and biller directory data; receiving search query data for searching a biller; building a biller search—machine learning model to optimize weights applied to the search query data; and ranking search results by utilizing the machine learning model in response to the search query data.

According to another aspect of the present disclosure, the method may further include: implementing a mean reciprocal rank (MRR) algorithm to measure model performance to further iterate for model improvement, but the disclosure is not limited thereto.

According to yet another aspect of the present disclosure, wherein in building the customer profile service area popularity model, the method may further include: utilizing the customer profile data, customer payment history data, biller information data, and biller directory data to use algorithm to build aggregating data as model output; utilizing the model output for searching the biller in response to the search query data; and implementing ranking of search results for the search query data without labeled data.

According to a further aspect of the present disclosure, the method may further include: implementing algorithm to address search related issues that include one or more of the following factors: name-based ranking algorithm, misspelling handling, whitespace handling, translating numeric letters to numbers, handling AND and &, but the disclosure is not limited thereto; and implementing machine learning algorithm to optimize weights applied to each factor, but the disclosure is not limited thereto.

According to an additional aspect of the present disclosure, the method may further include: building a biller search scoring model based on existing biller directory data and the customer profile service area popularity model in response to the search query data.

According to yet another aspect of the present disclosure, the method may further include: training the biller search machine learning model based on heuristics that include one or more of the following: user typed company name data matches to company name data, match user zip code with company zip code, match user county with company county, use distance as feature between user address and company address, use current location as feature between user address and company address, but the disclosure is not limited thereto.

According to a further aspect of the present disclosure, the method may further include: executing the heuristics instead of coding the heuristics on search logic; and creating soft labels in response to executing the heuristics.

According to yet another aspect of the present disclosure, the method may further include: training the biller search machine learning model on the soft labels; and creating genuine labels in response to training the biller search machine learning model.

According to an additional aspect of the present disclosure, the method may further include: retraining the biller search machine learning model which includes the soft labels and the genuine labels; and improving performance of the biller search machine learning model over time in response to the retraining which replaces soft labels with genuine labels over time.

According to a further aspect of the present disclosure, the method may further include: adjusting weights of the genuine labels compared to the soft labels.

According to yet another aspect of the present disclosure, the method may further include: implementing data augmentation and sampling algorithms to create variety of data from the genuine labels; and utilizing the variety of data by the biller search machine learning model for improving performance in outputting search results.

According to an aspect of the present disclosure, a system for implementing a payment application module for searching billers is disclosed. The system may include a plurality of data sources that include customer profile data, customer payment history data, biller information data, and biller directory data; and a processor operatively coupled to the plurality of data sources via a communication network. The processor may be configured to: build a customer profile service area popularity model based on the customer profile data, customer payment history data, biller information data, and biller directory data; receive search query data for searching a biller; build a biller search machine learning model to optimize weights applied to the search query data; and rank search results by utilizing the machine learning model in response to the search query data.

According to another aspect of the present disclosure, the processor may be further configured for: implementing a mean reciprocal rank (MRR) algorithm to measure model performance to further iterate for model improvement and to evaluate model improvement for the biller search machine learning model, but the disclosure is not limited thereto.

According to yet another aspect of the present disclosure, wherein in building the customer profile service area popularity model, the processor may be further configured for: utilizing the customer profile data, customer payment history data, biller information data, and biller directory data to use algorithm to build aggregating data as model output; utilizing the model output for searching the biller in response to the search query data; and implementing ranking of search results for the search query data without labeled data.

According to a further aspect of the present disclosure, the processor may be further configured for: implementing algorithm to address search related issues that include one or more of the following factors: name-based ranking algorithm, misspelling handling, whitespace handling, translating numeric letters to numbers, handling AND and &, but the disclosure is not limited thereto; and implementing machine learning algorithm to optimize weights applied to each factor, but the disclosure is not limited thereto.

According to an additional aspect of the present disclosure, the processor may be further configured for: building a coring model based on existing biller directory data and the customer profile service area popularity model in response to the search query data.

According to yet another aspect of the present disclosure, the processor pray be further configured for: training the biller search machine learning model based on heuristics that include one or more of the following: user typed company name data matches to company name data, match user zip code with company zip code, match user county with company county, use distance as feature between user address and company address, use current location as feature between user address and company address, but the disclosure is not limited thereto.

According to a further aspect of the present disclosure, the processor may be further configured for: executing the heuristics instead of coding the heuristics on search logic; and creating soft labels in response to executing the heuristics.

According to yet another aspect of the present disclosure, the processor may be further configured for: training the biller search machine learning model on the soft labels; and creating genuine labels in response to training the biller search machine learning model.

According to an additional aspect of the present disclosure, the processor may be further configured for: retraining the biller search machine learning model which includes the soft labels and the genuine labels; and improving performance of the biller search machine learning model over time in response to the retraining which replaces soft labels with genuine labels over time.

According to a further aspect of the present disclosure, the processor may be further configured for: adjusting weights to the genuine labels compared to the soft labels.

According to yet another aspect of the present disclosure, the processor may be further configured for: implementing data augmentation and sampling algorithms to create variety of data from the genuine labels; and utilizing the variety of data by the biller search machine learning model for improving performance in outputting search results.

According to an aspect of the present disclosure, a non-transitory computer readable medium configured to store instructions for implementing a payment application module for searching billers is disclosed. The instructions, when executed, may cause a processor to perform the following: accessing a plurality of data sources that include customer profile data, customer payment history data, biller information data, and biller directory data; building a customer profile service area popularity model based on the customer profile data, customer payment, history data, biller information data, and biller directory data; receiving search query data for searching a biller; building a biller search machine learning model to optimize weights applied to the search query data; and ranking search results by utilizing the machine learning model in response to the search query data.

According to another aspect of the present disclosure, the instructions, when executed, may further cause the processor to perform the following: implementing a mean reciprocal rank (MRR) algorithm to measure model performance to further iterate for model improvement, but the disclosure is not limited thereto.

According to yet another aspect of the present disclosure, wherein in building the customer profile service area popularity model, the instructions, when executed, may further cause the processor to perform the following: utilizing the customer profile data, customer payment history data, biller information data, and biller directory data to use algorithm to build aggregating data as model output; utilizing the model output for searching the biller in response to the search query data; and implementing ranking of search results for the search query data without labeled data.

According to a further aspect of the present disclosure, the instructions, when executed, may further cause the processor to perform the following: implementing algorithm to address search related issues that include one or more of the following factor: name-based ranking algorithm, misspelling handling, whitespace handling, translating numeric letters to numbers, handling AND and &, but the disclosure is not limited thereto; and implementing machine learning algorithm optimize weights applied to each factor, but the disclosure is not limited thereto.

According to an additional aspect of the present disclosure, the instructions, when executed, may further cause the processor to perform the following: building a scoring model based on existing biller directory data and the customer profile service area popularity model in response to the search query data.

According to yet another aspect of the present disclosure, the instructions, when executed, may further cause the processor to perform the following: training the biller search machine learning model based on heuristics that include one or more of the following: user typed company name data matches to company name data, match user zip code with company zip code, match user county with company county, use distance as feature between user address and company address, use current location as feature between user address and company address, but the disclosure is not limited thereto.

According to a further aspect of the present disclosure, the instructions, when executed, may further cause the processor to perform the following: executing the heuristics instead of coding the heuristics on search logic; and creating soft labels in response to executing the heuristics.

According to yet another aspect of the present disclosure, the instructions, when executed, may further cause the processor to perform the following: training the biller search machine learning model on the soft labels; and creating genuine labels in response to training the biller search machine learning model.

According to an additional aspect of the present disclosure, the instructions, when executed, may further cause the processor to perform the following: retraining the biller search machine learning model which includes the soft labels and the genuine labels; and improving performance of the biller search machine learning model over time in response to the retraining which replaces soft labels with genuine labels over time.

According to a further aspect of the present disclosure, the instructions, when executed, may further cause the processor to perform the following: adjusting weights of the genuine labels compared to the soft labels.

According to yet another aspect of the present disclosure, the instructions, when executed, may further cause the processor to perform the following: implementing data augmentation and sampling algorithms to create variety of data from the genuine labels and utilizing the variety of data by the biller search machine learning model for improving performance in outputting search results.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Figure 1:
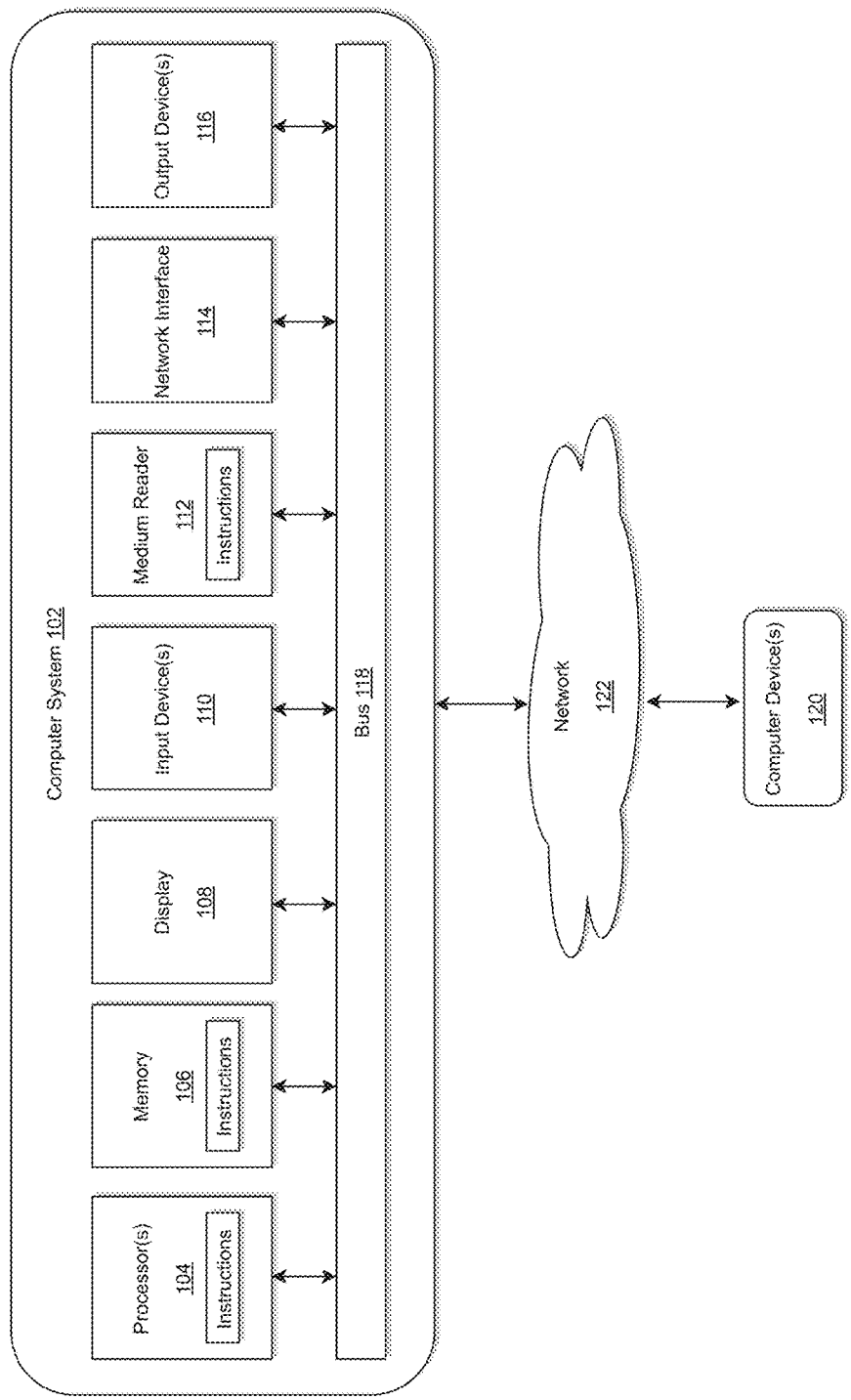
FIG. 1 illustrates a computer system for implementing a payment application module for searching billers in accordance with an exemplary embodiment.

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

As is traditional in the field of the present disclosure, example embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the example embodiments may be physically separated into two or more interacting and discrete blocks, units and/or modules without departing from the scope of the inventive concepts. Further, the blocks, units and/or modules of the example embodiments may be physically combined into more complex blocks, units and/or modules without departing from the scope of the present disclosure.

FIG. 1 is an exemplary system for use in implementing a payment application module for searching billers in accordance with the embodiments described herein. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term system shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (CPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecured and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid-state display, a cathode ray tube (CRT), a plasma display, or any other known display.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, can be used to perform one or more of the methods and processes as described herein. In a particular embodiment, the instructions may reside completely; or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and an operation mode having parallel processing capabilities. Virtual computer system processing can be constructed to implement one or more of the methods or functionality as described herein, and a processor described herein may be used to support a virtual processing environment.

As described herein, various embodiments provide optimized processes of implementing a payment application module for searching billers (i.e., payees) by utilizing service area popularity model and machine learning, but the disclosure is not limited thereto.

Figure 2:
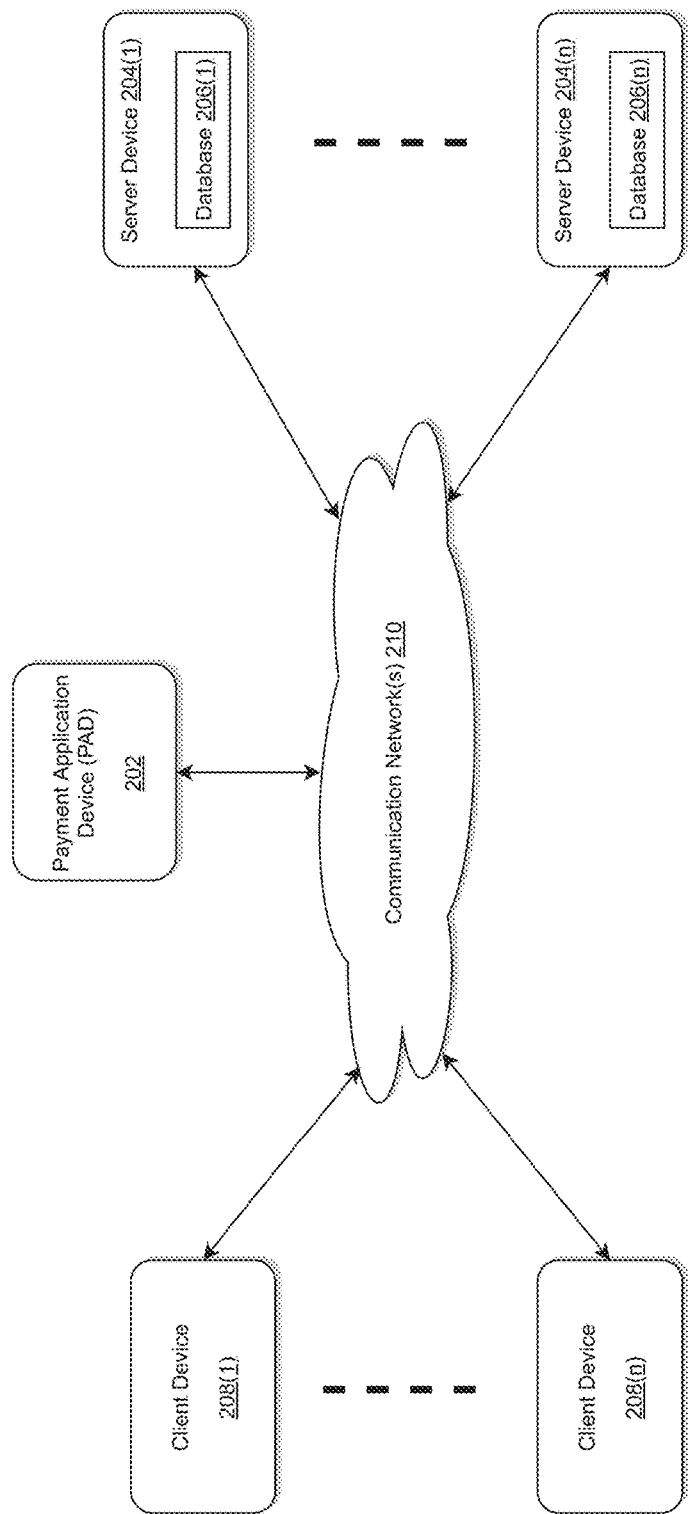
FIG. 2 illustrates an exemplary diagram of a network environment with a payment application device in accordance with an exemplary embodiment.

Referring to FIG. 2, a schematic of an exemplary network environment 200 for implementing a payment application device (PAD) of the instant disclosure is illustrated.

According to exemplary embodiments, the above-described problems associated with conventional methods and systems may be overcome by implementing an PAD 202 as illustrated in FIG. 2 by implementing a payment application module for searching billers (i.e., payees) by utilizing service area popularity model and machine learning, but the closure is not limited thereto.

The PAD 202 may be the same or similar to the computer system 102 as described with respect FIG. 1.

The PAD 202 may store one or more applications that can include executable instructions that, when executed by the PAD 202, cause the PAD 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the PAD 202 itself, may be located in virtual server(s) running in a cloud-based computing environment rather than being tied to one or more specific physical network computing devices. Also, the application(s) may be running in one or more virtual machines (VMs) executing on the PAD 202. Additionally; in one or more embodiments of this technology, virtual machines(s) running on the PAD 202 may be managed supervised by a hypervisor.

In the network environment 200 of FIG. 2, the PAD 202 is coupled to a plurality of server devices 204(1)-204(n) that hosts a plurality of databases 206(1)-206(n), and also to a plurality of client devices 208(1)-208(n) via communication networks) 210. A communication interface of the PAD 202, such as the network interface 114 of the computer system 102 of FIG. 1, operatively couples and communicates between the PAD 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements nary also be used.

The communication network(s) 210 may be the same or similar to the network 122 as described with respect to FIG. 1, although the PAD 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 202 in this example may employ any writable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The PAD 202 may be a standalone device or integrated with one or mare other devices or apparatuses, such as one or more of the server devices 204(1)-204(n), for example. In one particular example, the PAD 202 may be hosted by one of the server devices 204(1)-204(n), and other arrangements are also possible. Moreover, one or more of the devices of the PAD 202 may be in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the PAD 202 via the communication network(s) 210 according to the HTTP-based and/or JavaScript Object Notation (JSON) protocol, for example, although other protocols may also be used.

The server devices 204(1)-204(n) may be hardware or software or may represent system with multiple servers in a pool, which may include internal or external networks. The server devices 204(1)-204(n) hosts the databases 206(1)-206(n) that are configured to store metadata sets, data quality rules, and newly generated data.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network competing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. Client device in this context refers to any computing device that interfaces to communications network(s) 210 to obtain resources from one or more server devices 204(1)-204(n) or other client devices 208(1)-208(n).

According to exemplary embodiments, the client devices 208(1)-208(n) in this example may include any type of computing device that can facilitate the implementation of the PAD 202 that may be configured for implementing a payment application module for searching billers (i.e., payees) by utilizing service area popularity model and machine learning, but the disclosure is not limited thereto.

Accordingly, the client devices 208(1)-208(n) may be mobile computing devices, desktop computing devices, laptop computing devices, tablet computing devices, virtual machines (including cloud-based computers), or the like, that host chat, e-mail, or voice-to-text applications, of other document collaborative software for example.

The client devices 208(1)-208(n) may run interface applications, such as standard web browsers or standalone client applications, which tray provide an interface to communicate with the PAD 202 via the communication network(s) 210 in order to communicate user requests. The client devices 208(1)-208(n) may further include, among other features, a display device, such as a display screen or touchscreen, and/or an input device, such as a keyboard, for example.

Although the exemplary network environment 200 with the PAD 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the PAD 202, the server devices 204(1)-204(n) or the client devices 208(1)-208(n), for example, may be configured to operate as virtual instances on the same physical machine. For example, one or more of the PAD 202, the server devices 204(1)-204(n), or the client devices 208(1)-208(n) may operate on the same physical device rather than as separate devices communicating through communication network(s) 210. Additionally, there may be more or fewer PADs 202, server devices 204(1)-204(n), or client devices 208(1)-208(n) than illustrated in FIG. 2.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
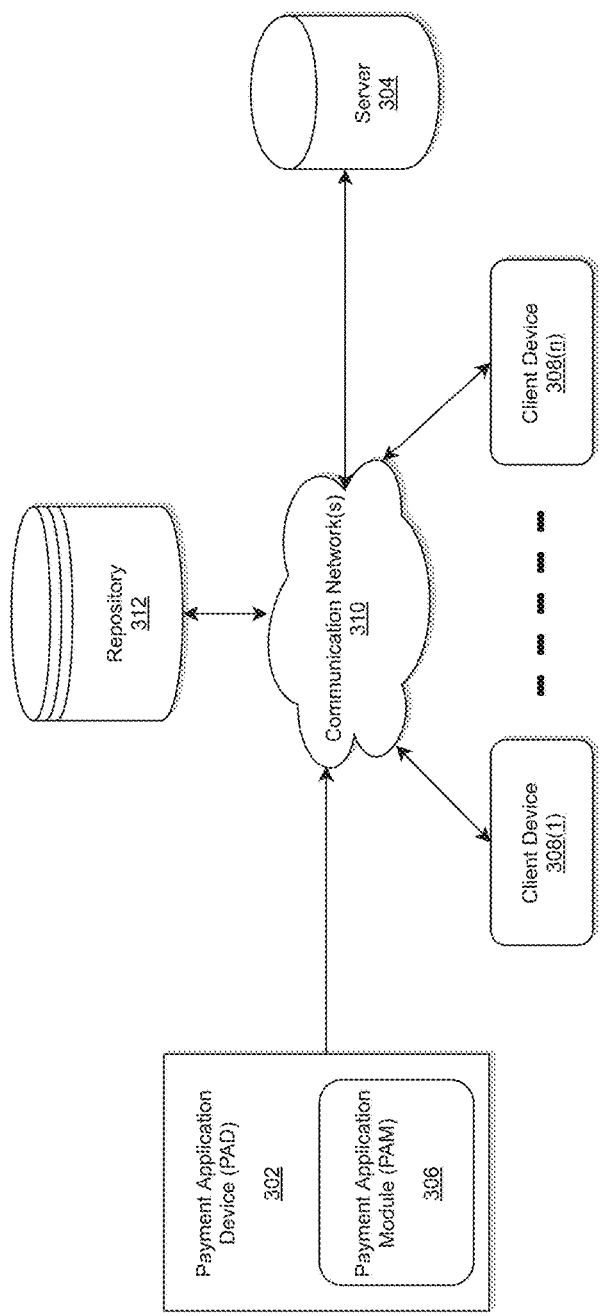
FIG. 3 illustrates a system diagram for implementing a payment application device with a payment application module in accordance with an exemplary embodiment.

FIG. 3 illustrates a system diagram 300 for implementing a PAD with a payment application module (PAM) in accordance with an exemplary embodiment.

As illustrated in FIG. 3, the PAD 302 including the PAM 306 may be connected to a server 304, and a repository 312 via a communication network 310. The PAD 302 may also be connected to a plurality of client devices 308(1)-308(n) via the communication network 310, but the disclosure is not limited thereto. According to exemplary embodiments, the PAM 306 may be implemented within the client devices 308(1)-308(n), but the disclosure is not limited thereto. According to exemplary embodiments, the client devices 308(1)-308(n) may be utilized for software application development and machine learning model generations, but the disclosure is not limited hereto.

According to exemplary embodiment, the PAD 302 is described and shown in FIG. 3 as including the PAM 306, although it may include other rules, policies, modules, databases, or applications, for example. According to exemplary embodiments, the repository 312 may be embedded within the PAD 302. Although only one repository 312 is illustrated in FIG. 3, according to exemplary embodiments, a plurality of repositories 312 may be provided. The repository 312 may include one or more memories configured to store login information, data files, data content, API specification definition file (e.g., in JASON format), customer profile data, customer payment history data, biller information data, and biller directory data, etc but the disclosure is not limited thereto. For example, the repository 312 may include one or more memories configured to store information including: rules, programs, production requirements, configurable threshold values defined by a product team to validate against service level objective (SLO), machine learning models, log data, hash values, etc but the disclosure is not limited thereto. According to exemplary embodiments, the PAM 306 may be configured to be storage platform agnostic—configured to be deployed across multiple storage layers.

According to exemplary embodiments, the PAM 306 may be configured to receive continuous feed of data from the repository 312 and the server 304 via the communication network 310.

As will be described below, the PAM 306 may be configured to access a plurality of data sources that include customer profile data, customer payment history data, biller information data, and biller directory data; build a customer profile service area popularity model based on the customer profile data, customer payment history data, biller information data, and biller directory data; receive search query data for searching a biller; build a biller search machine learning model to optimize, weights applied to the search query data; and rank search results by utilizing the machine learning model in response to the search query data, but the disclosure is not limited thereto.

The plurality of client devices 308(1)-308(n) are illustrated as being in communication with the PAD 302. In this regard, the plurality of client devices 308(1)-308(n) may be "clients" of the PAD 302 and are described herein as such. Nevertheless, it is to be known and understood that the plurality of client devices 308(1)-308(n) need not necessarily be "clients" of the PAD 302, or any entity described in association therewith herein. Any additional or alternative relationship may exist between either or more of the plurality of client devices 308(1)-308(n) and the PAD 302, or no relationship may exist.

One of the plurality of client devices 308(1)-308(n) may be, for example, a smart phone or a personal computer. Of course, the plurality of client devices 308(1)-308(n) may be any additional device described herein. According to exemplary embodiments, the server 304 may be the same or equivalent to the server device 204 as illustrated in FIG. 2.

The process may be executed via the communication network 310, which may comprise plural networks as described above. For example, in an exemplary embodiment, either one or more of the plurality of client devices 308(1)-308(n) may communicate with the PAD 302 via broadband or cellular communication. Of course, these embodiments are merely exemplary and are not limiting or exhaustive.

Figure 4:
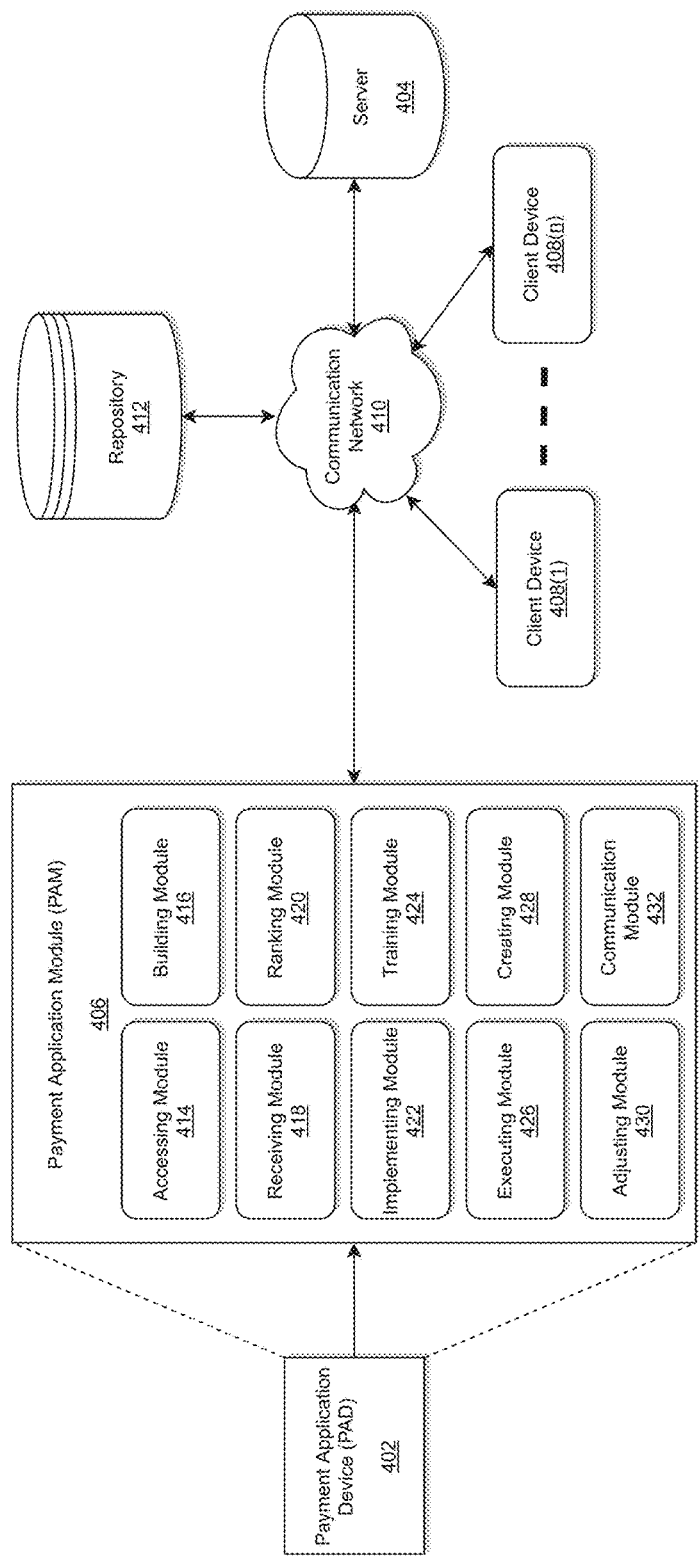
FIG. 4 illustrates a system diagram for implementing a payment application module of FIG. 3 in accordance with an exemplary embodiment.

FIG. 4 illustrates a system diagram for implementing a PAM of FIG. 3 in accordance with an exemplary embodiment.

As illustrated in FIG. 4, the system 400 may include a PAD 402 within which a PAM 406 may be embedded, a repository 412, a server 404, client devices 408(1)-408(n), and a communication network 410. According to exemplary embodiments, the PAD 402, PAM 406, repository 412, the server 404, the client devices 408(1)-408(n), and the communication network 410 as illustrated in FIG. 4 may be the same or similar to the PAD 302, the PAM 306, the repository 312, the server 304, the client devices 308(1)-308(n), and the communication network 310, respectively, as illustrated in FIG. 3.

According to exemplary embodiments, the repository 312, 412 may also be a private cloud-based repository that supports user authentication, repository security, and integration with existing databases and developments as well as stores open API specification definition file (i.e., in JASON format) corresponding to an application, but the disclosure is not limited thereto.

According to exemplary embodiments, the repository 312 and 412 may include a plurality of databases, such as a carbon database (i.e., for storing customer profile data), a platinum database (i.e., that stores payment history data), and an optimizer biller directory (i.e., that stores all information about the billers) (see, e.g., FIG. 5B), but the disclosure is not limited thereto.

As illustrated in FIG. 4, the PAM 406 may include an accessing module 414, a building module 416, a receiving module 418, a ranking module 420, an implementing module 422, a training module 424, an executing module 426, a creating module 428, an assigning module 430, and a communication module 432. According to exemplary embodiments, the repository 412 may be external to the PAD 402 may include various systems that are managed and operated by an organization. Alternatively, according to exemplary embodiments, the repository 412 may be embedded within the PAD 402 and/or the PAM 406.

According to exemplary embodiments, the PAM 406 may be implemented via user interfaces, e.g., web user interface, a build automation tool used primarily for Java projects, private Jenkins, etc., but the disclosure is not limited thereto, and may be integrated with a private cloud platform (see, e.g., FIGS. 5A and 5B) and a distributed file system platform (see, e.g., FIG. 5B) via the PAM 406 and an authentication service, but the disclosure is not limited thereto. The user interface may be operatively connected to a system of record in one end and an open source platform for analytics and dashboard in another end.

The process may be executed via the communication module 432 and the communication network 410, which may comprise plural networks as described above. For example, in an exemplary embodiment, the various components of the PAM 406 may communicate, with the server 404, and the repository 412 via the communication module 432 and the communication network 410. Of course, these embodiments are merely exemplary and are not limiting or exhaustive.

According to exemplary embodiments, the communication network 410 and the communication module 432 may be configured to establish a link between the repository 412, the client devices 408(1)-408(n) and the PAM 406.

According to exemplary embodiments, each of the accessing module 414, building module 416, receiving module 418, ranking module 420, implementing module 422, training module 424, executing module 426, creating module 428, assigning module 430, and the communication module 432 may be implemented by microprocessors or similar, they may be programmed using software (e.g., microcode) to perform various functions discussed herein and may optionally be driven by firmware and/or software. Alternatively, each of the accessing module 414, building module 416, receiving module 418, ranking module 420, implementing module 422, training module 424, executing module 426, treating module 428, adjusting module 430, and the communication module 432 may be implemented by dedicated hardware, or as a combination of dedicated hardware to perform some functions and a processor (e.g., one or more programmed microprocessors and associated circuitry) to perform other functions. Also, according to exemplary embodiments, each of the accessing module 414, building module 416, receiving module 418, ranking module 420, implementing module 422, training module 424, executing module 426, creating module 428, adjusting module 430, and the communication module 432 may be physically separated into two or more interacting and discrete blocks, units, devices, and/or modules without departing from the scope of the inventive concepts.

According to exemplary embodiments, each of the accessing module 414, building module 416, receiving module 418, ranking module 420, implementing module 422, training module 424, executing module 426, creating module 428, adjusting module 430, and the communication module 432 may be called by corresponding API, but the disclosure is not limited thereto.

Figure 5A:
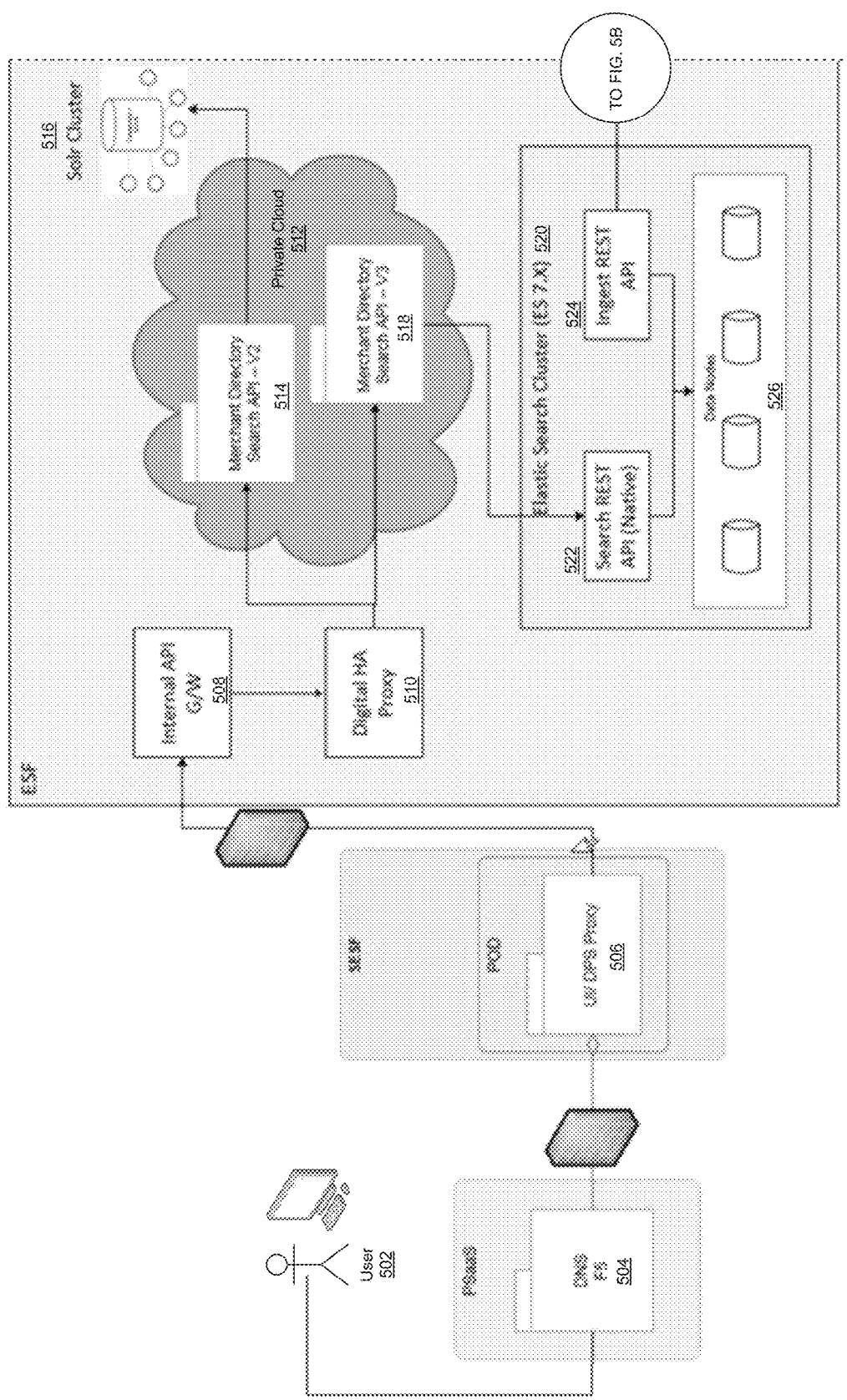
FIGS. 5A and 5B illustrate an exemplary use case of a system diagram searching a biller in accordance with an exemplary embodiment.
Figure 5B:
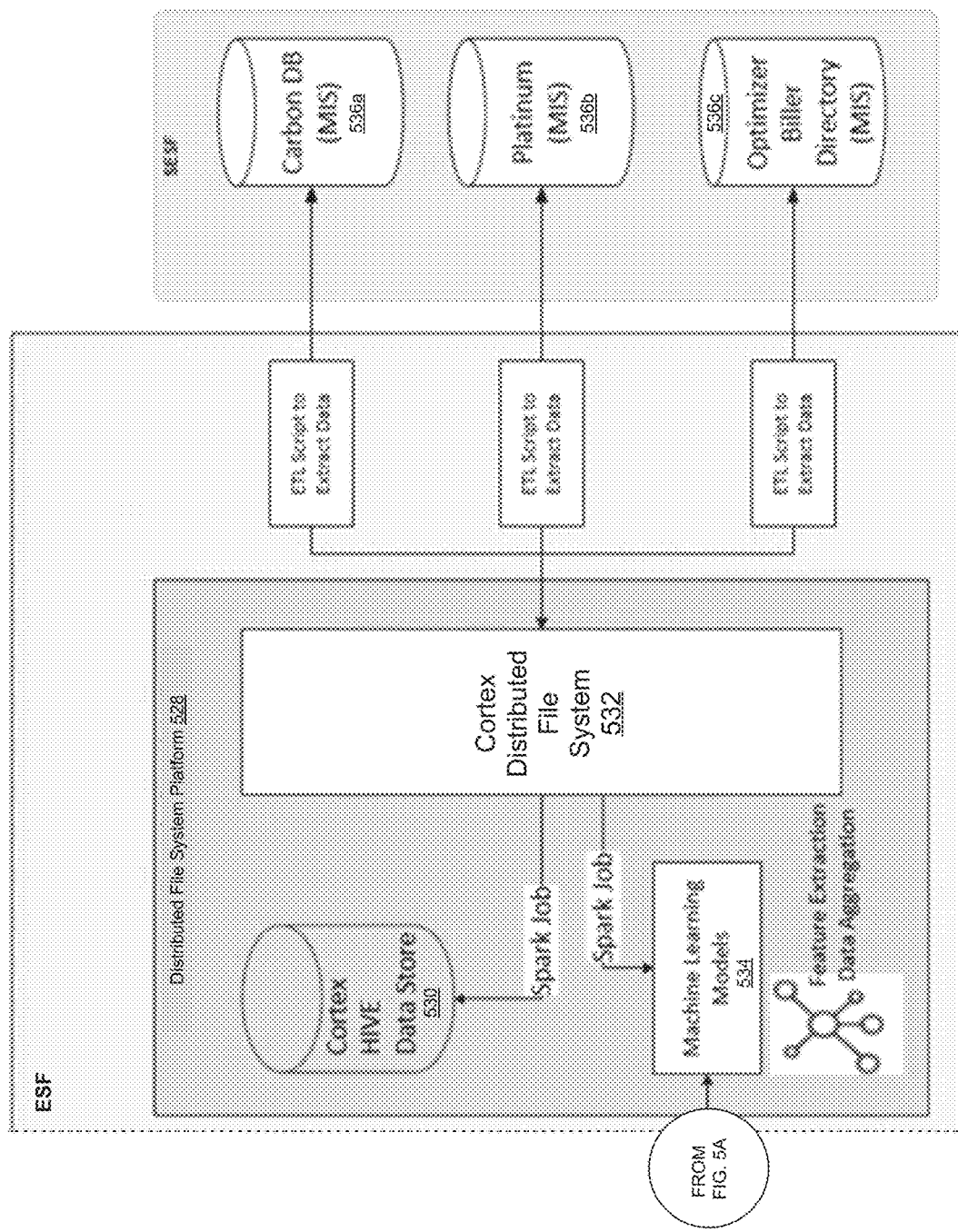

FIG. 5A and FIG. 5B, in combination illustrate an exemplary use case of a system diagram for searching a biller in accordance with an exemplary embodiment.

For example, the system diagram 500 of FIGS. 5A and 5B illustrate a user 502 (who would like to initiate a biller search) operatively connected with a DNS (domain name system) 504 which is connected to a UI/DPS proxy 506. As illustrated in FIGS. 5A and 5B, the UI/DPS proxy 506 may communicate with an internal API gateway 508 for data exchange. The internal API gateway 508 may communicate with digital HA proxy 510 for data exchange. The digital HA proxy 510 may communicate with a private cloud 512 for accessing merchant directory. The private cloud 512 may include a merchant directory search API-V2 514 which may be operatively connected to a Solr Cluster 516. The private cloud 512 may also include a merchant directory search API-V3 518 which may be operatively connected to an elastic search cluster 520.

When the user 502 searches through the elastic search cluster 520, both the search REST (representational state transfer) API (native) 522 and the ingest REST API 524 may search via data nodes 526. The elastic search cluster 520 may be operatively connected to a distributed file system platform 528. The distributed file system platform 528 may include a cortex HIVE data store 530, a cortex distributed file system 532, and machine learning models 534, but the disclosure is not limited thereto. The cortex distributed file system 532 may be operatively connected to a carbon database 536a, a platinum database 536b, and an optimizer biller directory database 536c, but the disclosure is not limited thereto.

The data from the carbon database 536a, the platinum database 536b, and the optimizer biller directory database 536c may be extracted into the cortex distributed file system 532 using an ETL (extract-transform-load) process. In response, the cortex distributed file system 532 may initiate Spark job that use soft label of the product for data relevance and use machine learning to find real labels (hard labels or genuine labels). And then ingest this data into the elastic search cluster 520. When the user 502 searches in be elastic search cluster 520, it searches through the data nodes 526.

Referring to FIGS. 4, 5A and 5B, more detailed processes for searching billers will be described below in accordance with exemplary embodiments.

For example, according to exemplary embodiments, the accessing module 414 may be configured to access the carbon database 536a that includes customer profile data, the platinum database 536b that includes customer payment history data, and the optimizer biller directory database 536c that includes biller information data and biller directory data, etc., but the disclosure is not limited thereto.

According to exemplary embodiments, building module 416 may be configured to build a customer profile service area popularity model based on the customer profile data, customer payment history data, biller information data, and biller directory data.

According to exemplary embodiments, the receiving module 418 may be configured to receive search query data from the user 502 for searching a biller.

According to exemplary embodiments, the building module 416 may also be configured to build a biller search machine learning model to optimize weights applied to the search query data and the ranking module 420 may be configured to rank search results by utilizing the machine learning model (i.e., machine learning models 534) in response to the search query data.

According to exemplary embodiments, the implementing module 422 may be configured to implement a mean reciprocal rank (MRR) algorithm to measure model performance to further iterate for model improvement, but the disclosure is not limited thereto.

According to exemplary embodiments, wherein in building the customer profile service area popularity model, PAM 406 may utilize the customer profile data, customer payment history data, biller information data, and biller directory data to use algorithm to build aggregating data as model output; utilize the model output far searching the biller in response to the search query data; and implement ranking of search results for the search query data without labeled data.

According to exemplary embodiments, the implementing module 422 may be configured to implement algorithm to address search related issues that include one or more of the following factors: name-based ranking algorithm, misspelling handling, whitespace handling, translating numeric letters to numbers, handling AND and &, etc., but the disclosure is not limited thereto; and implement machine learning algorithm to optimize weights applied to each factor, but the disclosure is not limited thereto.

According to exemplary embodiments, the building module 416 may also be configured to build a scoring model based on existing biller directory data and the customer profile service area popularity model in response to the search query data.

According to exemplary embodiments, the training module 424 may be configured to train the biller search machine learning model based on heuristics that include one or more of the following: user typed company name data matches to company name data, match user zip code company zip code, match user county with company county, use distance as feature between user address and company address, use current location as feature between user address and company address, but the disclosure is not limited thereto.

According to exemplary embodiments, the executing module 426 may be configured to execute the heuristics instead of coding the heuristics on search logic; and the creating module 428 may create soft labels in response to executing the heuristics. Instead of coding the heuristics on search logic, execute heuristics and create soft labels. For example, user zipcode may be 12345. AT&T zipcode 12345 may be selected when presented with five AT&T results.

The creating module 428 may be configured to create features based on domain knowledge and heuristics, e.g., matching score for company name, zip code matching score, city match score, county, state match, e.g., CA or California, popularity score for company etc. The heuristics will create features with zero values. Overtime, model will assign values to the correct features. Heuristics may include: billers in the same code, or nearby zip code which will be given higher priority; popularity of the biller, etc., but the disclosure is not limited thereto.

According to exemplary embodiments, the training module 424 may be configured to train the biller search machine learning model on the soft labels; and the creating module 428 may create genuine labels in response to training the biller search machine learning model.

For example, in training the biller search machine learning model on soft labels initially will be a simple model and it will learn heuristics mentioned above. The biller search machine learning model will give the same result as the heuristics have given. The model will learn automatically which rules play a role, and discover new features.

According to exemplary embodiments, while using the model search, in production, the model will produce the same result that heuristics produce, e.g., company with same zip code will be at top rank. User 502 will select right company to add payee. If top result is correct, user 502 will select or user 502 will select company at rank 2, 3, 4 etc. In some cases, user 502 will search again with additional criteria and select right payee company. These steps will create genuine labels.

According to exemplary embodiments, the training module 424 may be configured to retrain the biller search machine learning model which includes the soft labels and the genuine labels; and improving performance of the biller search machine learning model over time in response to the retraining which replaces soft labels with genuine labels over time.

According to exemplary embodiments, the adjusting module 430 may be configured to adjusts weights of the genuine labels compared to the soft labels. The PAM 406 will give more weightage to genuine labels. Variety of techniques can be used, e.g., data augmentation, sampling, ensemble with different weightage, K-fold cross validation, specialized algorithm, metrics or loss functions, etc. for this purpose, but the disclosure is not limited thereto.

For example, according to exemplary embodiments, the implementing module 422 may be configured to implement data augmentation and sampling algorithms to create variety of data from the genuine labels; and utilize the variety of data by the biller search machine learning model for improving performance in outputting search results.

Figure 6:
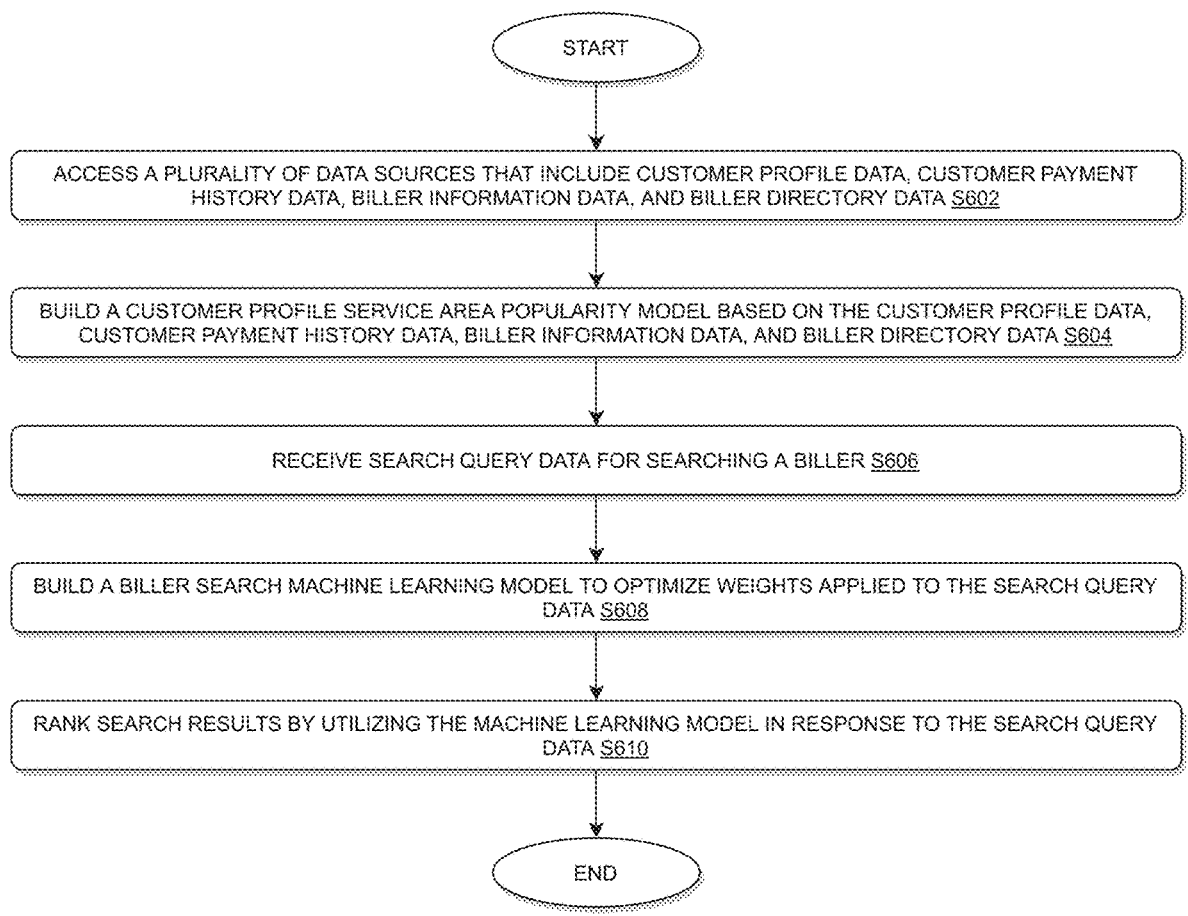
FIG. 6 illustrates a flow diagram for searching billers in accordance with exemplary embodiment.

FIG. 6 illustrates a flow diagram for searching billers in accordance with an exemplary embodiment.

In the process 600 of FIG. 6, at step S602, a plurality of data sources may be accessed to access data that include customer profile data, customer payment history data, biller information data, and biller directory data, but the disclosure is not limited thereto.

At step S604, the process 600 may build a customer profile service area popularity model based on the customer profile data, customer payment history data, biller information data, and biller directory data.

At step S606, the process 600 may receive search query data for searching a biller.

At step S608, the process 600 may build a biller search machine learning model to optimize weights applied to the search query data.

At step S610, the process 600 may rank search results by utilizing the machine learning model in response to the search query data.

According to exemplary embodiments, the process 600 may further include: implementing a mean reciprocal rank (MRR) algorithm to measure model performance to further iterate for model improvement, but the disclosure is not limited thereto.

According to exemplary embodiments, wherein in building the customer profile service area popularity model, the process 600 may further include: utilizing the customer profile data, customer payment history data, biller information data, and biller directory data to use algorithm to build aggregating data as model output; utilizing the model output for searching the biller in response to the search query data; and implementing ranking of search results for the search query data without labeled data.

According to exemplary embodiments, the process 600 may further include: implementing algorithm to address search related issues that include one or more of the following factors: name-based ranking algorithm, misspelling handling, whitespace handling, translating numeric letters to numbers, handling AND and &, but the disclosure is not limited thereto; and implementing machine learning algorithm to optimize weights applied to each factor, but the disclosure is not limited thereto.

According to exemplary embodiments, the process 600 may further include: building a biller search scoring model based on existing biller directory data and the customer profile service area popularity model in response to the search query data.

According to exemplary embodiments, the process 600 may further include: training the biller search machine learning model based on heuristics that include one or more of the following: user typed company name data matches to company name data, match user zip code with company zip code, match user county with company county, use distance as feature between user address and company address, use current location as feature between user address and company address, but the disclosure is not limited thereto.

According to exemplary embodiments, the process 600 may further include: executing the heuristics instead of coding the heuristics on search logic; and creating soft labels in response to executing the heuristics.

According to exemplary embodiments, the process 600 may further include: training the biller search machine learning model on the soft labels; and creating genuine labels inn response to training the biller search machine learning model.

According to exemplary embodiments, the process 600 may further include: retraining the biller search machine learning model which includes the soft labels and the genuine labels; and improving performance of the biller search machine learning model over time in response to the retraining which replaces soft labels with genuine labels over time.

According to exemplary embodiments, the process 600 may further include: adjusting weights of the genuine labels compared to the soft labels.

According to exemplary embodiments, the process 600 may further include: implementing data augmentation and sampling algorithms to create variety of data from the genuine labels; and utilizing the variety of data by the biller search machine learning model for improving performance in outputting search results.

According to exemplary embodiments, the PAD 402 may include a memory (e.g., a memory 106 as illustrated in FIG. 1) which may be a non-transitory computer readable medium that may be configured to store instructions for implementing the PAM 406 for automatically searching billers by utilizing service area popularity model and machine learning as disclosed herein. The PAD 402 may also include a medium reader (e.g., a medium reader 112 as illustrated in FIG. 1) which may be configured to read any one or more sets of instructions, e.g., software, from any of the memories described herein. The instructions, when executed by a processor embedded within the PAM 406 or within the PAD 402, may be used to perform one or more of the methods and processes as described herein. In a particular embodiment, the instructions may reside completely, or at least partially, within the memory 106, the medium reader 112, and/or the processor 104 (see FIG. 1) during execution by the PAD 402.

For example, the instructions, when executed, may cause the processor 104 to perform the following: accessing a plurality of data sources that include customer profile data, customer payment history data, biller information data, and biller directory data; building a customer profile service area popularity model based on the customer profile data, customer payment history data, biller information data, and biller directory data; receiving search query data for searching a biller; building a biller search machine learning model to optimize weights applied to the search query data; and ranking search results by utilizing the machine learning model in response to the search query data, but the disclosure is not limited thereto.

According to exemplary embodiments, the instructions, when executed, may further cause the processor 104 to perform the following: implementing a mean reciprocal rank (MRR) algorithm to measure model performance to further iterate for model improvement, but the disclosure is not limited thereto.

According to exemplary embodiments, wherein in building the customer profile service area popularity model, the instructions, when executed, may further cause the processor 104 to perform the following: utilizing the customer profile data, customer payment history data, biller information data, and biller directory data to use algorithm to build aggregating data as model output; utilizing the model output for searching the biller in response to the search query data; and implementing ranking of search results for the search query data without labeled data.

According to exemplary embodiments, the instructions, when executed, may further cause the processor 104 to perform the following: implementing algorithm to address search related issues that include one or more of the following factors: name-based ranking algorithm, misspelling handling, whitespace handling, translating numeric letters to numbers, handling AND and &, but the disclosure is not limited thereto; and implementing machine learning algorithm to optimize weights applied to each factor, but the disclosure is not limited thereto.

According to exemplary embodiments, the instructions, when executed, may further cause the processor 104 to perform the following: building a scoring model based on existing biller directory data and the customer profile service area popularity model in response to the search query data.

According to exemplary embodiments, the instructions, when executed, may further cause the processor 104 to perform the following: training the biller search machine learning model based on heuristics that include one or more of the following: user typed company name data marches to company name data, match user zip code with company zip code, match user county with company county, use distance as feature between user address and company address, use current location as feature between user address and company address, but the disclosure is not limited thereto.

According to exemplary embodiments, the instructions, when executed, may further cause the processor 104 to perform the follow executing the heuristics instead of coding the heuristics on search logic; and creating soft labels in response to executing the heuristics.

According to exemplary embodiments, the instructions, when executed, may further cause the processor 104 to perform the following: training the biller search machine learning model on the soft labels; and creating genuine labels in response to training the biller search machine learning model.

According to exemplary embodiments, the instructions, when executed, may further cause the processor 104 to perform the following: retraining the biller search machine learning model which includes the soft labels and the genuine labels; and improving performance of the biller search machine learning model over time in response to the retraining which replaces soft labels with genuine labels over time.

According to exemplary embodiments, the instructions, when executed, may further cause the processor 104 to perform the following: adjusting weights of the genuine labels compared to the soft labels.

According to exemplary embodiments, the instructions, when executed, may further cause the processor 104 to perform the following: implementing data augmentation and sampling algorithms to create variety of data from the genuine labels; and utilizing the variety of data by the biller search machine learning model for improving performance in outputting search results.

According to exemplary embodiments as disclosed above in FIGS. 1-6, technical improvements effected by the instant disclosure may include platforms for implementing a payment application module for searching billers (i.e., payees) by utilizing service area popularity model and machine learning, but the disclosure is not limited thereto.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable readable medium or media and/or comprise a transitory computer-readable medium or media. In a particular non-limiting, exemplary embodiment, the computer-readable medium can include a solid-state memory such as a memory or other package that houses one or more non-volatile read-only memories. Further, the computer-readable medium can be a random access me or other volatile re-writable memory. Additionally, the computer-readable readable medium include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for implementing a payment application module for searching fillers by utilizing one or more processors and one or more memories, the method comprising:
    accessing a plurality of data sources that include customer profile data, customer payment history data, biller information data, and biller directory data;
    building a customer profile service area popularity model based on the customer profile data, customer payment history data, biller information data, and biller directory data;
    receiving search query data for searching a biller;
    building a biller search machine learning model to optimize weights applied to the search query data; and
    ranking search results by utilizing the machine learning model in response to the search query data.

2. The method according to claim 1, further comprising:
    implementing a mean reciprocal rank (MRR) algorithm to measure model performance to further iterate for model improvement.

3. The method according to claim 1, wherein building the customer profile service area popularity model further comprising:
    utilizing the customer profile data, customer payment history data, biller information data, and biller directory data to use algorithm to build aggregating data as model output;
    utilizing the model output for searching the biller in response to the search query data; and
    implementing ranking of search results for the search query data without labeled data.

4. The method according to claim 3, further comprising:
    implementing algorithm to address search related issues that include one or more of the following factors: name-based ranking algorithm, misspelling handling, whitespace handling, translating numeric letters to numbers, handling AND and &; and
    implementing machine learning algorithm to optimize weights applied to each factor.

5. The method according to claim 1, further comprising:
    building a scoring model based on existing biller directory data and the customer profile service area popularity model in response to the search query data.

6. The method according to claim 1, further comprising:
    training the biller search machine learning model based on heuristics that include one or more of the following: user typed company name data matches to company name data, match user zip code with company zip code, match user county with company county, use distance as feature between user address and company address, use current location as feature between user address and company address.

7. The method according to claim 1, further comprising:
    executing the heuristics instead of coding the heuristics on search logic; and
    creating soft labels in response to executing the heuristics.

8. The method according to claim 7, further comprising:
    training the biller search machine learning model on the soft labels; and
    creating genuine labels in response to training the biller search machine learning model.

9. The method according to claim 8, further comprising:
    retraining the biller search machine learning model which includes the soft labels and the genuine labels; and
    improving performance of the biller search machine learning model over time in response to the retraining which replaces soft labels with genuine labels over time.

10. The method according to claim 8, further comprising:
    adjusting weights of the genuine labels compared to the soft labels.

11. The method according to claim 8, further comprising:
implementing data augmentation and sampling algorithms to create variety of data from the genuine labels; and
utilizing the variety of data by the biller search machine learning model for improving performance in outputting search results.

12. A system for implementing a payment application module for searching billers, the system comprising:
a plurality of data sources that include customer profile data, customer payment history data, biller information data, and biller directory data; and
a processor operatively coupled to the plurality of data sources via a communication network, wherein the processor is configured to:
build a customer profile service area popularity model based on the customer profile data, customer payment history data, biller information data, and biller directory data;
receive search query data for searching a biller;
build a biller search machine learning model to optimize weights applied to the search query data; and
rank search results by utilizing the machine learning model in response to the search query data.

13. The system according to claim 12, wherein the processor is further configured to:
implement a mean reciprocal rank (MRR) algorithm to measure model performance to further iterate for model improvement.

14. The system according to claim 12, wherein in building the customer profile service area popularity model, the processor is further configured to:
utilize the customer profile data, customer payment history data, biller information data, and biller directory data to use algorithm to build aggregating data as model output;
utilize the model output for searching the biller in response to the search query data; and
implement ranking of search results for the search query data without labeled data.

15. The system according to claim 14, wherein the processor is further configured to:
implement algorithm to address search related issues that include one or more of the following factors: name-based ranking algorithm, misspelling handling, whitespace handling, translating numeric letters to numbers, handling AND and &; and
implement machine learning algorithm to optimize weights applied to each factor.

16. The system according to claim 12, wherein the processor is further configured to:
build a scoring model based on existing biller directory data and the customer profile service area popularity model in response to the search query data.

17. The system according to claim 12, wherein the processor is further configured to:
train the biller search machine learning model based on heuristics that include one or more of the following: user typed company name data matches to company name data, match user zip code with company zip code, match user county with company county, use distance as feature between user address and company address, use current location as feature between user address and company address.

18. The system according to claim 12, wherein the processor is further configured to:
execute the heuristics instead of coding the heuristics on search logic; and
create soft labels in response to executing the heuristics.

19. The system according to claim 18, wherein the processor is further configured to:
train the biller search machine learning model on the soft labels;
create genuine labels in response to training the biller search machine learning model;
retraining the biller search machine learning model which includes the soft labels and the genuine labels; and
improving performance of the biller search machine learning model over time in response to the retraining places soft labels with genuine labels over time.

20. A non-transitory computer readable medium configured to store instructions for implementing a payment application module for searching billers, wherein, when executed, the instructions cause a processor to perform the following:
accessing a plurality of data sources that include customer profile data, customer payment history data, biller information data, and biller directory data;
building a customer profile service area popularity model based on the customer profile data, customer payment history data, biller information data, and biller directory data;
receiving search query data for searching a biller;
building a biller search machine learning model to optimize weights applied to the search query data; and
ranking search results by utilizing the machine learning model in response to the search query data.

* * * * *